United States Patent [19]
Braswell

[11] Patent Number: 4,573,855
[45] Date of Patent: Mar. 4, 1986

[54] SWINGABLE TIRE CARRIER

[75] Inventor: Charles Braswell, Burnet, Tex.

[73] Assignee: Tejas Designs, Inc., Burnet, Tex.

[21] Appl. No.: 661,457

[22] Filed: Oct. 16, 1984

[51] Int. Cl.⁴ ............................................. B62D 43/04
[52] U.S. Cl. ................................ 414/463; 224/42.23; 224/42.25; 414/917
[58] Field of Search ............... 414/463, 464, 465, 466, 414/917; 224/42.21, 42.23, 42.25, 42.44

[56] References Cited
U.S. PATENT DOCUMENTS

| | | | |
|---|---|---|---|
| 3,187,914 | 6/1965 | Peras | 414/463 |
| 3,485,399 | 12/1969 | Hebnes | 414/466 |
| 3,904,093 | 9/1975 | Hanela | 224/42.23 X |
| 4,072,258 | 2/1978 | Cruson | 414/463 X |
| 4,278,191 | 7/1981 | Mecham | 224/42.23 X |
| 4,312,620 | 1/1982 | Muschalek | 414/466 |

Primary Examiner—Leslie J. Paperner
Attorney, Agent, or Firm—Walter C. Farley

[57] ABSTRACT

A tire carrier includes a mounting frame which can be fixedly attached to the undersurface of a vehicle and a tire receiving frame dimensioned to receive a tire usable on the vehicle. A parallelogram suspension arrangement extends between the mounting frame and the tire receiving frame to permit the tire receiving frame to swing between a storage position in which the tire receiving frame is directly beneath the mounting frame and an extended position in which the tire receiving frame is in a position in which the tire can be extracted or inserted. A latch mechanism is provided as well as an over-center spring mechanism to assist the user in moving the tire receiving frame between positions.

6 Claims, 5 Drawing Figures

SWINGABLE TIRE CARRIER

This invention relates to an improved tire carrier which is particularly useful for carrying a spare tire on a truck or other motor vehicle and which is movable between a storage position and an access position.

BACKGROUND OF THE INVENTION

Some forms of pick-up trucks and other kinds of motor vehicles are originally equipped with spare tire carriers or, alternatively, such carriers can be added later. These carriers generally consist of a metal frame fixedly mounted beneath the vehicle frame, either at the side or, in many pick-up trucks, beneath the truck bed at the rear of the truck body. Such carriers have an open side for insertion and removal of a spare tire and some form of movable latch bar or other device to keep the tire from falling out. under various circumstances, thereby decreasing the clearance beneath the truck. Despite such depth, it is sometimes quite difficult to remove the tire, primarily because it must be handled while the person attempting to handle it is in a clumsy and uncomfortable squatting position. This is especially true when the carrier is at the rear of the truck and a rear tire is the one needing replacement.

BRIEF SUMMARY OF THE INVENTION

The present invention provides a swingable carrier which is not significantly more complicated than the fixed carriers of the prior art but which is much more convenient to use and can be constructed to minimize the clearance reduction beneath the vehicle on which it is mounted.

Also, the carrier of the present invention is provided with a secure latch which can be locked to prevent unauthorized opening of the carrier but which is easily unlatched to provide convenient access to the tire by one who is authorized to do so.

Briefly described, the invention includes a tire carrier for use with a vehicle comprising a mounting frame attachable to an undersurface of the vehicle, a tire receiving frame dimensioned to receive a tire usable on the vehicle, pivotable means for interconnecting the tire receiving frame and the mounting frame such that the tire receiving frame is suspended below the mounting frame and is movable between a retracted, storage position and an extended, open position, and manually releasable latch mechanism engageable between the mounting frame and the tire receiving frame for retaining the tire receiving frame in the storage position.

In order that the manner in which the advantages of the invention are attained can be understood in detail, a particularly advantageous embodiment thereof will be described with reference to the accompanying drawings, which form a part of this specification, and wherein.

DESCRIPTION OF THE PREFERRED EMBODIMENT

Figure 1:
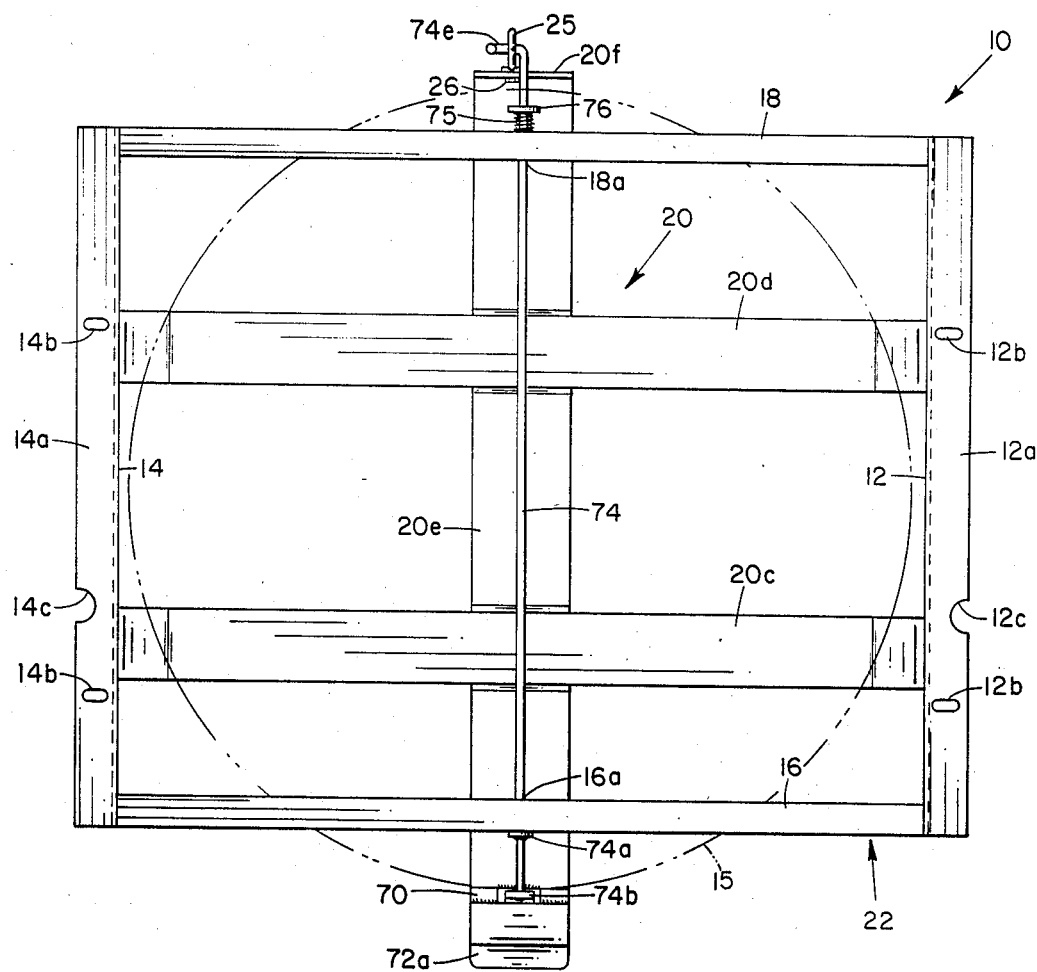
FIG. 1 is a top plan view of a tire carrier in accordance with the invention with the tire receiving portion thereof in its retracted or stored position.

Referring now to the drawings in detail, it will be seen that the tire carrier indicated generally at 10 includes a tire receiving frame indicated generally at 20, a mounting frame indicated generally at 22, and right and left-hand folding mechanisms indicated generally at 30 and 40 which act as pivotable means for interconnecting the tire receiving frame with the mounting frame such that the tire receiving frame is suspended below the mounting frame and is movable between a retracted storage position and an extended, open position. In addition, the structure includes a latch plate 72 which cooperates with a lock bar 74b for retaining the tire receiving frame in the storage position. The tire receiving frame 20 is dimensioned to receive a tire, shown in phantom lines at 15, of a size suitable for the vehicle 28 to which the mounting frame is attached, a fragment of the vehicle being shown in FIGS. 2 and 3.

The mounting frame includes side plates 12 and 14 which are substantially parallel with each other and which are provided with outwardly extending flanges 12a and 14a. Flanges 12a, 14a lie in substantially the same plane and are provided with elongated mounting holes 12b and 14b, respectively, and semi-circular cutouts 12c and 14c for proper locating and mounting of the mounting frame to the undersurface of a convenient portion of vehicle 28. In this connection, it should be mentioned that the location for mounting frame 22 depends entirely upon the construction of the vehicle and the desires of the user. When mounting the apparatus on a pick-up truck, it is generally convenient to position the mounting frame underneath the rear of the truck bed in the vicinity of the rear bumper, or under the bumper if the truck is supplied with a step-type of bumper which has sufficient undersurface to accommodate the attachment of flanges 12a, 14a. It will be observed that the entire assembly can be disposed so that it is in front of, and partially concealed by, the rear bumper when the tire carrier is in the position shown in FIG. 3, a typical location for the bumper being indicated in phantom lines at 17.

The mounting frame further includes cross braces 16 and 18 which extend between opposite ends of the upper portions of side plates 12 and 14, the cross braces being penetrated by holes 16a and 18a, respectively, which are aligned with each other to receive a lock rod 74. Cross braces 16, 18 can be welded or otherwise securely attached to the side plates.

Figure 2:
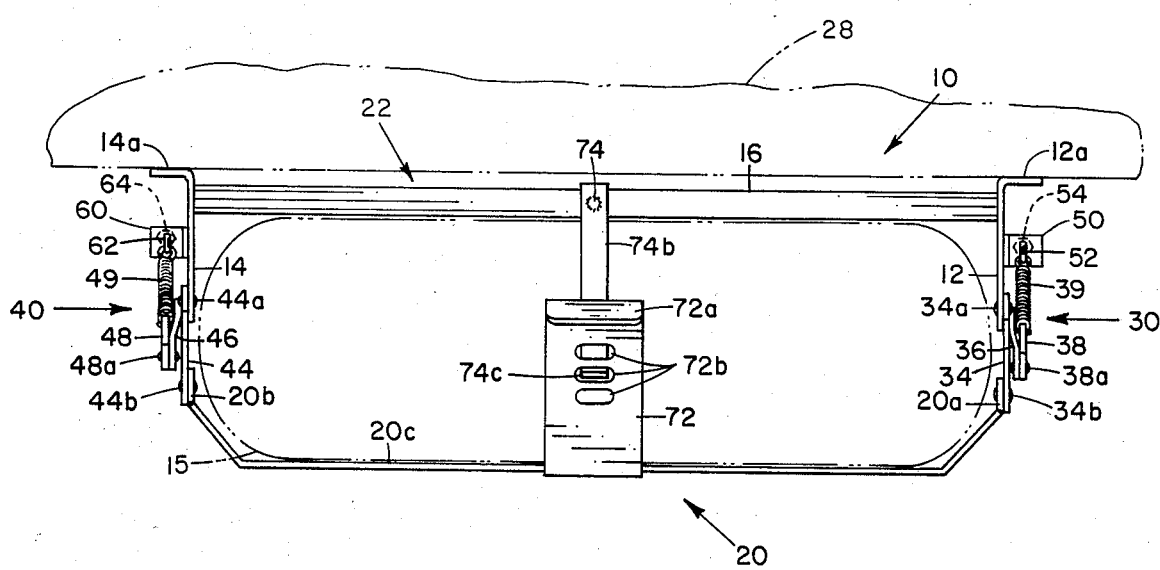
FIG. 2 is a front elevation of the carrier of FIG. 1.

The tire receiving frame 20 includes right and left-hand side support bars 20a and 20b which lie in planes parallel with side plates 12 and 14 and, in the embodiment shown, lie in the same planes as the side plates. Cross straps 20c and 20d extend transversely between opposite ends of side bars 20b and 20c, the cross straps having generally horizontal center portions and upwardly bent end portions to conform generally to the silhouette of a tire as seen in FIG. 2. The ends of the cross straps can be welded or riveted to the side support bars. A center strap 20e extends perpendicular to the cross straps and is fixedly attached at the centers of the cross straps, the center strap being provided with indentations so that the majority of the upper surface thereof lies in essentially the same plane as the upper surfaces of the cross straps. At the forward end of center strap 20e is a hinge 70 to which is attached a locking plate 72. At the rear of center strap 20e is an upwardly extending strap portion 20f to which is attached a hook-shaped latch bar 25, the bar being connected to strap portion 20f by bolts 26 and nuts 27 so that it is rigidly attached thereto.

Figure 3:
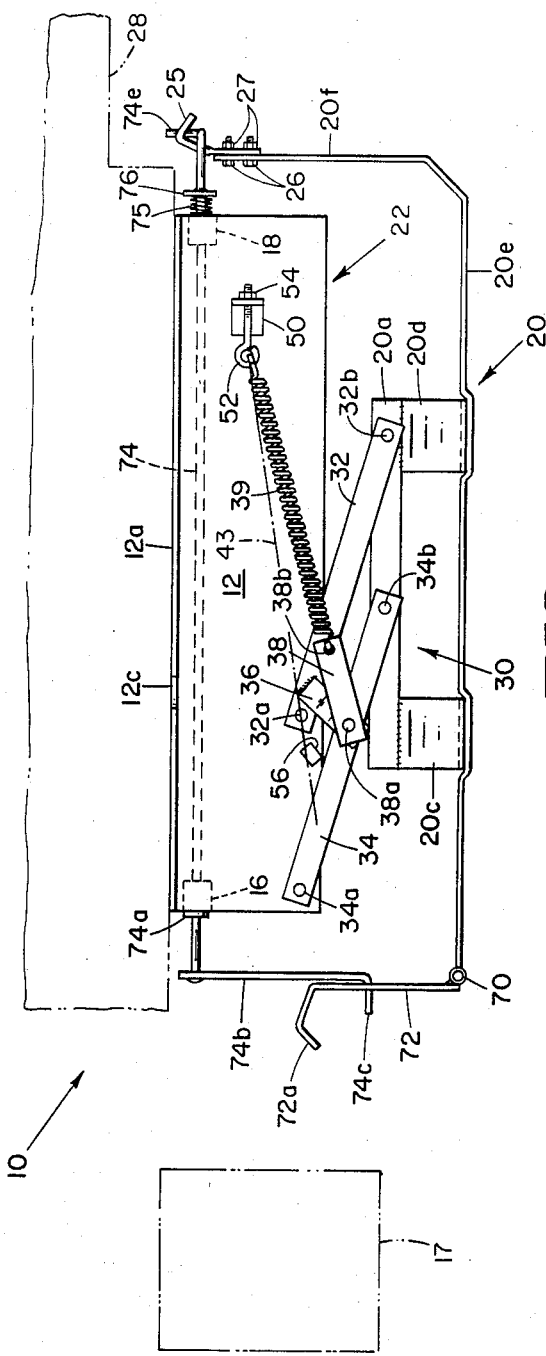
FIG. 3 is a side elevation of the carrier of FIGS. 1 and 2.
Figure 4:
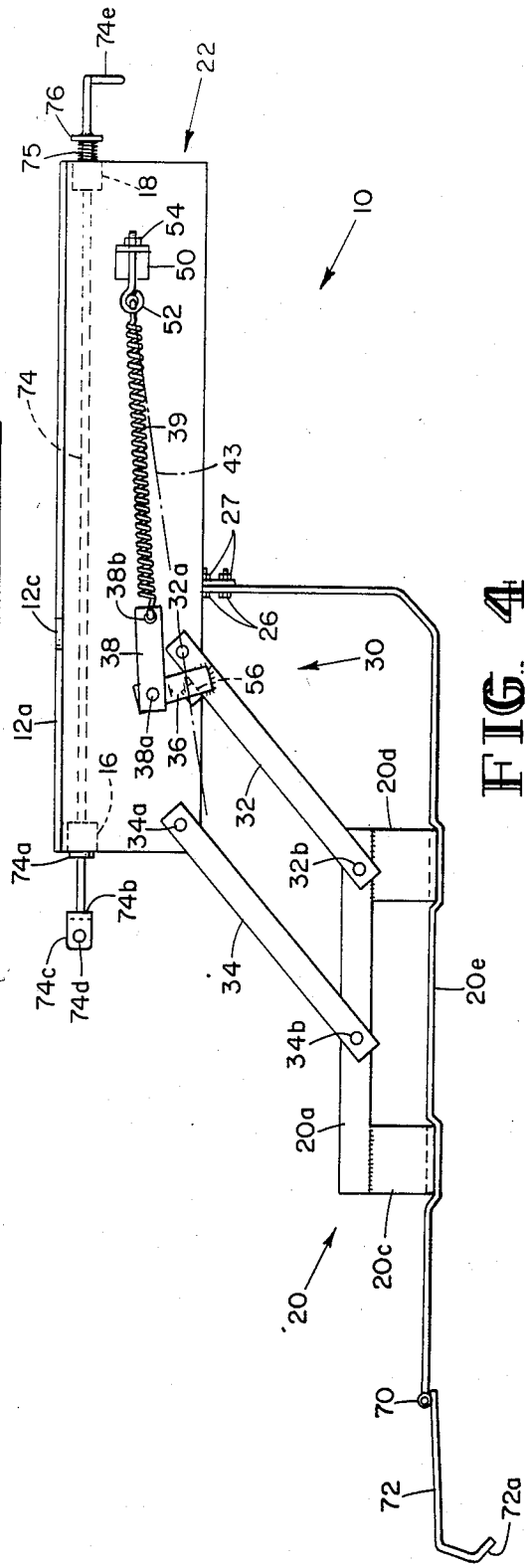
FIG. 4 is a side elevation of the carrier FIGS. 1-3 with the tire carrying portion thereof in the open or extended position in which a tire can be inserted or removed.
Figure 5:
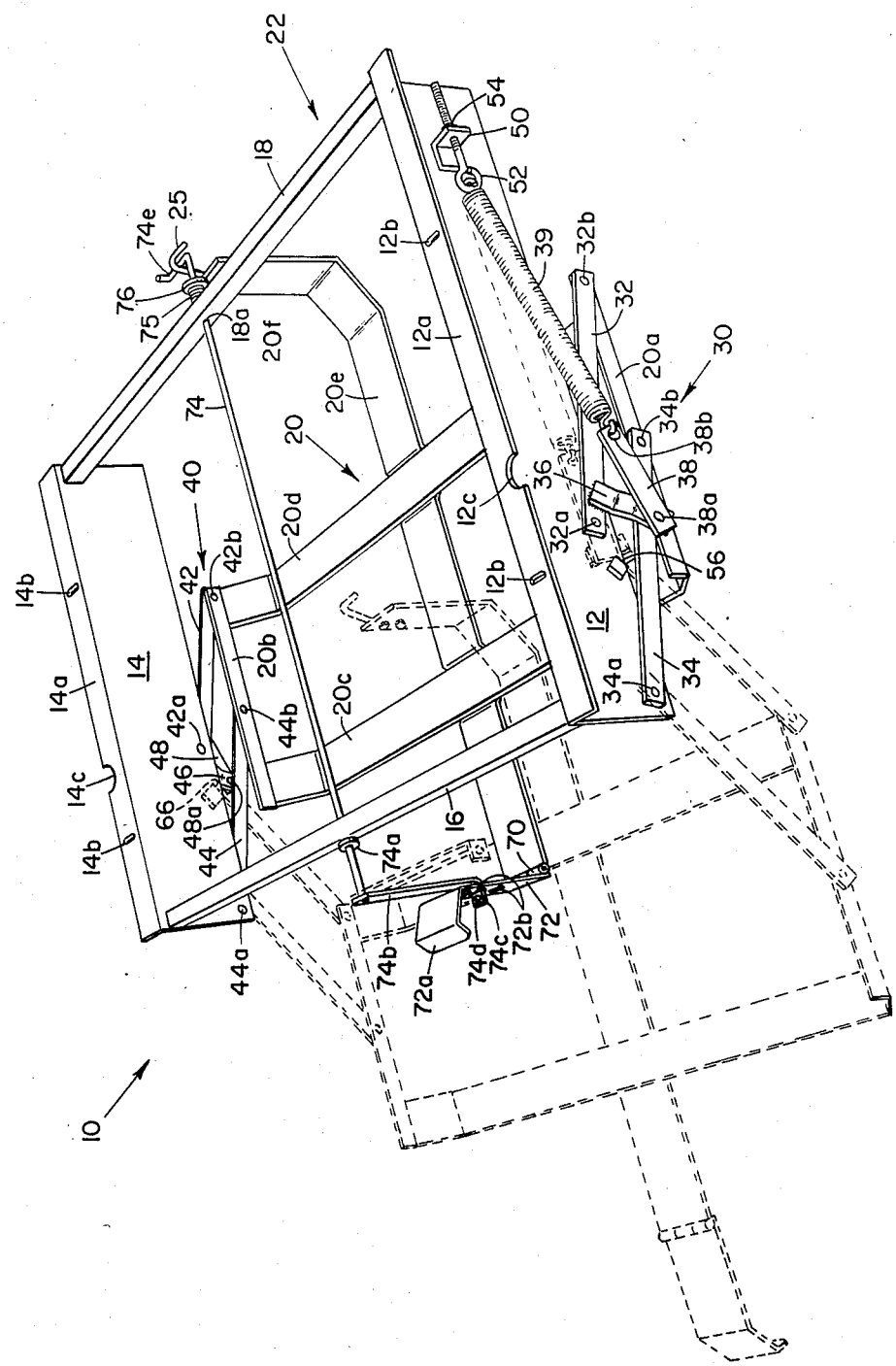
FIG. 5 is a perspective view of the carrier of FIGS. 1-4 showing the tire receiving portion in the stored position in solid lines and the extended position in dashed lines.

The folding mechanisms 30 and 40 include arms 32 and 34 on one side and arms 42 and 44 on the other side, the pairs of arms being pivotally connected by pivot pins 32a, 34a, 42a and 44a to side plates 12 and 14, respectively. These pivot pins, which can be rivets loosely attached, permit pivotal movement of arms 32, 34, 42 and 44. The other ends of the arms are connected to side support bars 20a and 20b, respectively, by pivot pins 32b, 34b, 42b and 44b. The pivot pins are spaced equally on the side plates and side bars and the arms are of substantially equal lengths so that the pairs of side bars form parallelogram mechanisms, permitting side bars 20a, 20b to move in planes parallel with each other, with themselves, and with side plates 12, 14. As seen in FIGS. 3, 4 and 5, the movement sequence from the storage position is downward, forward and then upward, to the extent necessary, bringing the tire support frame 20 to an accessible position.

An over-center spring and link mechanism is also provided on each side of the tire carrier to assist the user in removing a tire from tire receiving frame 20 or returning the tire receiving frame to its storage position. The over center mechanism on the right-hand side includes an offset arm 36 which is a relatively short link welded at one end to the outer surface of arm 32, the other end of arm 36 being pivotally attached by a pivot pin 38a to a link 38. The other end of link 38 has a hole 38b which receives one end of an extension coil spring 39. The other end of spring 39 is received in the eye of an eyebolt 52 which passes through an opening in an angle 50, welded to the outside of side plate 12, eyebolt 52 being retained therein by a nut 54.

The over-center mechanism including arm 36, link 38 and spring 39 operates to pass across a line 43 which extends between the connection point of spring 39 at eyebolt 52 and the pivot axis of pivot pin 32a. Spring 39, which tends to pull link 38 toward eyebolt 52, operates to urge the parallelogram suspension system toward the position shown in FIG. 3 whenever pivot pin 38a is below line 43, and the spring operates to urge the tire receiving frame 20 toward the position shown in FIG. 4 whenever pivot pin 38a is above line 43. The motion in the direction shown in FIG. 4 is limited by a stop block 56 which is welded to the outer surface of plate 12 in the desired position. Thus, when the tire receiving frame is in the position shown in FIG. 4, it is firmly held in that position by the action of spring 39 pressing arm 32 against stop block 56 so that an individual can extract a tire or insert a tire without having to be concerned about erratic, wobbling movement of the tire receiving frame.

On the left-hand side, suspension mechanism 40 is also provided with an over-center mechanism including an offset arm 46, a link 48, a pivot pin 48a, a spring 49 acting between a hole 48b in link 48 and an eyebolt 62 which is mounted in an angle 60 and retained by a nut 64. This mechanism is also provided with a stop block 66, these components functioning as described in connection with the over-center mechanism on the right-hand side.

Rod 74 extends entirely through cross braces 16 and 18 and protrudes at both ends thereof, the rear end being attached to a lock bar 74b which, in the stored position shown in FIGS. 2 and 3, extends downwardly, the lower end of the lock bar being bent forwardly to form a padlock extension flange 74c. A washer 74a is welded or otherwise fixedly attached to bar 74 to limit the longitudinal movement of rod 74 and of lock bar 74b and flange 74c. Locking plate 72, which is hingedly connected to the rear end of center strap 20e as previously described, is provided with elongated transversely extending openings 72b, any one of which can receive the padlock extension flange. A plurality of such openings are provided to accommodate tires of differing sizes. The upper end of locking plate 72 is bent outwardly to form a handle 72a.

At the opposite end of rod 74, a washer 76 is fixedly attached to the rod so that it is spaced from the forward surface of cross brace 18 and a compression coil spring 75 is positioned between washer 76 and bar 18 to provide clearance but maintain the rod in the proper position. The rear end of rod 74 is bent laterally and then upwardly to form a hook-like rod latch which cooperates with latch bar 25.

As will be recognized, rod latch 74e extends transversely and upwardly when rod 74 is in a rotational position such that lock bar 74b extends downwardly. In that position, padlock extension flange 74c extends through locking plate 72 so that a padlock shackle can be inserted through the hole 74d in flange 74c to lock locking plate 72 in the position shown in FIG. 3. At the other end of the mechanism, latch bar 25 engages the hook-like portion of rod latch 74e to support and maintain the position of the other end of the mechanism. In addition, springs 39 and 49 are acting on the over center linkage and parallelogram suspension mechanism to hold the apparatus in its closed or storage position.

When one wishes to insert or extract a tire into or from the tire receiving frame 20, the padlock is removed from extension flange 74c and handle 72a is pulled outwardly, extracting the padlock extension flange from the one of openings 72b through which it had extended. This releases lock bar 74b so that it is free to rotate about the axis of rod 74. The user then continues to pull on handle 72a, which is now in the orientation shown in FIG. 4, causing tire receiving frame 20 to begin a downward movement as arms 32, 34, 42 and 44 swing about their pivot points. Latch bar 25 pulls downwardly on rod latch 74e, causing rod 74 to rotate about its longitudinal axis in a counterclockwise direction, as seen in FIG. 2, until bar 74b is in approximately the position shown in FIG. 4. Rod 74 and its associated mechanisms remain in this position because of the frictional action of compression spring 75.

Continued pulling on handle 72a causes the tire receiving frame to move toward the position shown in FIG. 4, this pulling being resisted only by the action of springs 39 and 49 to a point at which the pivot pins 38a and 48a cross the plane containing line 43, after which springs 39 and 49 assist the user in moving the tire receiving frame fully into the position shown in FIG. 4. At that location, a tire can be inserted into or extracted from the tire receiving frame.

The tire receiving frame is then returned to its storage position by simply pushing on the frame until pivot pins 38a, 48a again cross the plane containing line 43 after which springs 39, 49 assist in returning frame 20 to its storage position. The mechanism can then be locked by manually rotating rod 74 through a 90 degree angle by grasping lock bar 74b and moving it down to a position in which it can again be latched by swinging locking plate 72 upwardly into the position shown in FIG. 3. At that point, a padlock or a retaining pin can again be inserted through opening 74d. As will be recognized, rotation of lock bar 74b also rotates rod latch 74e into the position in which it engages latch bar 25. Thus, the tire receiving frame is coupled to the mounting frame at both ends. As a result of this arrangement, the use of a single padlock secures the mechanism and essentially encloses the tire within a locked cage, not only preventing access at the end where the padlock is provided but also preventing access through the other end which, in some vehicles, might be reachable. The various components of the tire carrier disclosed herein can be made of galvanized steel, aluminum or other materials.

While one advantageous embodiment has been chosen to illustrate the invention, it will be understood by those skilled in the art that various changes and modifications can be made therein without departing from the scope of the invention as defined in the appended claims.

What is claimed is:

1. A tire carrier for use with a vehicle comprising:
   a mounting frame attachable to an undersurface of the vehicle;
   a tire receiving frame dimensioned to receive a tire usable on the vehicle;
   pivotable means for interconnecting said tire receiving frame and said mounting frame such that said tire receiving frame is suspended below said mounting frame and is movable between a retracted, storage position and an extended, open position;
   manually releasable latch means acting between said mounting frame and said tire receiving frame for retaining said tire receiving frame in said storage position, said latch means including
   a rod pivotable about an axis parallel with the direction of movement of said tire receiving frame;
   a lock bar carried by said rod at one end thereof and extending generally perpendicularly from said rod;
   a hook carried by and movable with the other end of said rod;
   means at one end of said tire receiving frame for engaging said hook in said storage position; and
   means at the other end of said tire receiving frame for engaging said lock bar when said rod is rotated such that said hook is engaged, whereby rotation of said rod is prevented until said lock bar is disengaged.

2. A tire carrier in accordance with claim 1, wherein said pivotable means includes
   a swingable arm pivotally mounted on said mounting frame;
   an over center link movable across a line passing through the pivot point of said arm; and
   spring means urging said over center link in a direction tending to urge said tire receiving frame toward said storage position when said link is on one side of said line and said extended position when said link is on the other side of said line.

3. A tire carrier in accordance with claim 1, wherein said pivotable means includes
   a set of parallelogram links interconnecting said mounting frame and said tire receiving frames;
   an over-center link pivotably coupled to a pivot point movable with one of said parallelogram links;
   a tension spring acting between said over center link and said mounting frame for urging said tire receiving frame toward said storage position when said overcenter link is on one side of a straight line passing through the mounting frame pivot point of said one of said parallelogram links and the mounting frame connection point of said spring, and toward said extended position when said over-center link is on the other side of said line.

4. A tire carrier in accordance with claim 1, wherein said mounting frame includes
   a pair of side plates;
   means for rigidly fixing said side plates in parallel, spaced relationship, the distance between said plates being greater than a tire usable on the vehicle; and
   means including a plurality of openings for attaching said side plates to the vehicle.

5. A tire carrier in accordance with claim 4, wherein said tire receiving frame comprises
   a plurality of transverse strap members shaped and dimensioned to extend across the undersurface of a tire;
   side bar means for interconnecting the ends of said transverse strap means with each other;
   a longitudinal strap extending perpendicularly to and being fixedly attached to said transverse strap means; and
   means at one end of said longitudinal strap defining an upwardly extending end barrier to limit longitudinal movement of a tire inserted therein.

6. A tire carrier in accordance with claim 5, wherein said pivotable means includes
   first and second arms on each side of said mounting frame, each of said arms being pivotally connected to one of said side plates and to the adjacent one of said side arms, said arms being mounted in parallel pairs to form two parallelogram suspension arrangements;
   a tension spring fixedly attached at one end to the outer surface of one of said side plates; and
   an over-center link pivotally coupled at one end to one of said arms and attached at the other end to the other end of said spring.

* * * * *